(12) United States Patent
Lim et al.

(10) Patent No.: US 8,781,256 B2
(45) Date of Patent: Jul. 15, 2014

(54) METHOD TO MATCH COLOR IMAGE AND DEPTH IMAGE USING FEATURE POINTS

(75) Inventors: Hwa Sup Lim, Hwaseong-si (KR); Jae Young Sim, Yongin-si (KR); Byong Min Kang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 956 days.

(21) Appl. No.: 12/265,838

(22) Filed: Nov. 6, 2008

(65) Prior Publication Data

US 2009/0324062 A1  Dec. 31, 2009

(30) Foreign Application Priority Data

Jun. 25, 2008 (KR) .......... 10-2008-0060256

(51) Int. Cl.
*G06K 9/32* (2006.01)

(52) U.S. Cl.
USPC ............ 382/294; 382/154; 382/190; 382/167

(58) Field of Classification Search
USPC .................. 382/154, 190, 167, 294
See application file for complete search history.

(56) References Cited

U.S. PATENT DOCUMENTS

| | | | |
|---|---|---|---|
| 6,271,876 B1 * | 8/2001 | McIntyre et al. ............... 348/46 |
| 6,483,876 B1 * | 11/2002 | Chang et al. ............. 375/240.16 |
| 6,778,137 B2 | 8/2004 | Krikorian et al. |
| 6,778,173 B2 | 8/2004 | Han et al. ...................... 345/420 |
| 6,847,728 B2 * | 1/2005 | Tao et al. ...................... 382/106 |
| 7,373,012 B2 * | 5/2008 | Avidan et al. ................. 382/260 |
| 2003/0012277 A1 * | 1/2003 | Azuma et al. ............ 375/240.08 |
| 2003/0169906 A1 * | 9/2003 | Gokturk et al. ............... 382/115 |
| 2004/0037450 A1 * | 2/2004 | Bradski ......................... 382/103 |
| 2004/0091164 A1 * | 5/2004 | Sakatani et al. .............. 382/254 |
| 2004/0095999 A1 * | 5/2004 | Piehl et al. ............... 375/240.16 |
| 2005/0031166 A1 * | 2/2005 | Fujimura et al. ............. 382/103 |
| 2005/0190972 A1 * | 9/2005 | Thomas et al. ............... 382/218 |
| 2006/0221250 A1 * | 10/2006 | Rossbach et al. ............ 348/630 |
| 2007/0036408 A1 * | 2/2007 | Kim et al. ..................... 382/128 |
| 2007/0146503 A1 * | 6/2007 | Shiraki ...................... 348/231.3 |

FOREIGN PATENT DOCUMENTS

| | | |
|---|---|---|
| JP | 07-284118 | 10/1995 |
| JP | 7-284118 | 10/1995 |
| JP | 2004-013869 | 1/2004 |

(Continued)

OTHER PUBLICATIONS

Chan et al., Experimens on block-matching techniques for video coding, Multimedia Systems, vol. 2, 1994, pp. 228-241.*

(Continued)

*Primary Examiner* — Jayesh A Patel
(74) *Attorney, Agent, or Firm* — Staas & Halsey LLP

(57) ABSTRACT

An image processing method and apparatus includes selecting a first pixel group including at least one pixel from an input color image; selecting a second pixel group including at least one pixel corresponding to each of the at least one pixel included in the first pixel group from an input depth image; calculating a transformation function of the first pixel group and second pixel group based on a coordinate value of each of the at least one pixel included in the first pixel group and a coordinate value of each of the at least one pixel included in the second pixel group; and matching each pixel of the input color image with each pixel of the input depth image based on the transformation function.

17 Claims, 8 Drawing Sheets

(56) References Cited

FOREIGN PATENT DOCUMENTS

| | | |
|---|---|---|
| JP | 2004-13869 | 1/2004 |
| JP | 2005-045559 | 2/2005 |
| JP | 2005-45559 | 2/2005 |
| KR | 10-2003-0043638 | 6/2003 |
| KR | 2003-0043638 | 6/2003 |
| KR | 10-2005-0066400 | 6/2005 |
| KR | 10-2006-0007816 | 1/2006 |
| KR | 10-2006-0063558 | 6/2006 |
| KR | 10-0724889 | 6/2007 |
| KR | 10-2006-0119879 | 12/2007 |

OTHER PUBLICATIONS

Chan et al., Experiments on block-matching techniques for video coding, Multimedia Systems, vol. 2, 1994, pp. 228-241.*

Korean Office Action issued Apr. 29, 2014 in Korean Patent Application No. 10-2008-0060256.

* cited by examiner

METHOD TO MATCH COLOR IMAGE AND DEPTH IMAGE USING FEATURE POINTS

CROSS-REFERENCE TO RELATED APPLICATION

This application claims the benefit of Korean Patent Application No. 10-2008-0060256, filed on Jun. 25, 2008, in the Korean Intellectual Property Office, the disclosure of which is incorporated herein by reference.

BACKGROUND OF THE INVENTION

1. Field of the Invention

One or more embodiments of the present invention relate to a method of matching color and depth images, and more particularly, to an image matching method using a feature point of color and depth images.

2. Description of Related Art

Currently, information about a three-dimensional (3D) image is widely used in a variety of applications. In general, 3D information includes geometry information and color information. A color image may be obtained using a device such as a Charged Coupled Device (CCD) or Complementary Metal-Oxide-Semiconductor (CMOS) camera. A depth image may be indirectly detected from a plurality of color images using computer vision technology, or directly obtained using a depth camera.

Since the development of depth cameras in hardware is slow in comparison to a color image camera, a method of indirectly detecting a depth image using computer vision technology has been conducted in a conventional art. However, the method using computer vision technology is complex and inaccurate. Accordingly, a direct method using a depth camera is currently the focus of attention along with the development of depth camera in hardware.

According to a principle of depth camera, for example, light such as infrared (IR) light is irradiated to an object, and a Time of Flight (TOF) is measured by sensing reflected light to measure a distance (depth) from a depth camera to each part of the object.

Also, an intensity image may be obtained depending on an intensity of IR light sensed by a sensor. An intensity image is associated with information about a distance to an object and object status such as a color, temperature, brightness, and the like. Humans may identify an object through the intensity image more easily in comparison to the depth image.

When both color image and depth image of a single object is obtained, the color and depth images are generally measured from different viewpoints. Also, since a specification of a camera obtaining the color image is not the same as that of a camera obtaining the depth image, a resolution of the color image is usually different from that of the depth image. Accordingly, a method of matching color and depth images having different resolutions and viewpoints is required.

BRIEF SUMMARY

An embodiment of the present invention provides an image processing method using feature points, which are selected from color and depth images and correspond to each other, to improve efficiency of matching the color and depth images.

Another embodiment of the present invention also provides an image processing method using feature points, which are selected from an intensity image corresponding to a depth image and correspond to each other, while matching the depth image and color image.

According to an embodiment of the present invention, there is provided an image processing apparatus, including: a first selection unit selecting a first pixel group including at least one pixel from an input color image; a second selection unit selecting a second pixel group including at least one pixel corresponding to each of the at least one pixel included in the first pixel group from an input depth image; a calculation unit calculating a transformation function of the first pixel group and second pixel group based on a coordinate value of each of the at least one pixel included in the first pixel group and a coordinate value of each of the at least one pixel included in the second pixel group; and an image matching unit matching each pixel of the input color image with each pixel of the input depth image based on the transformation function.

In this instance, the first selection unit selects the first pixel group including the at least one pixel by applying a corner detection algorithm to the input color image. The corner detection algorithm uses a Harris operator.

According to an embodiment of the present invention, the second selection unit selects at least one pixel of the input depth image by applying a corner detection algorithm to the input depth image, matches each of the at least one pixel of the input depth image with each of the at least one pixel included in the first pixel group, and selects the second pixel group including the at least one pixel of the matched input depth image.

In this instance, the transformation function is a transformation matrix obtained by using a DLT algorithm.

According to an embodiment of the present invention, when a deviation of Z coordinate value of each of the at least one pixel included in the second pixel group is less than a predetermined value, the calculation unit calculates the transformation function excluding information about the Z coordinate value of each of the at least one pixel included in the second pixel group.

In this instance, an Interpolation may be applied to each pixel of the input depth image, when a resolution of the input color image is not identical to that of the input depth image, each of the pixels of the input depth image being matched with each pixel of the input color image.

According to another embodiment of the present invention, there is provided an image processing apparatus, including: a first selection unit selecting a first pixel group including at least one pixel from an input color image; a second selection unit selecting a second pixel group including at least one pixel corresponding to each of the at least one pixel included in the first pixel group from an intensity image matched with an input depth image; a calculation unit calculating a transformation function of the first pixel group and second pixel group based on a coordinate value of each of the at least one pixel included in the first pixel group and a coordinate value of each of the at least one pixel included in the second pixel group; and an image matching unit matching each pixel of the input color image with each pixel of the input depth image based on the transformation function.

According to still another embodiment of the present invention, there is provided an image processing apparatus, including: a first selection unit selecting a first pixel group including at least one pixel from an input color image; a second selection unit receiving information about a second pixel group including at least one pixel corresponding to each of the at least one pixel included in the first pixel group from an intensity image matched with an input depth image; a calculation unit calculating a transformation function of the first pixel group and second pixel group based on a coordinate value of each of the at least one pixel included in the first pixel group and a coordinate value of each of the at least one pixel included in the second pixel group; and an image matching unit matching each pixel of the input color image with each pixel of the input depth image based on the transformation function.

According to yet another embodiment of the present invention, there is provided an image processing method, including: selecting a first pixel group including at least one pixel from an input color image; selecting a second pixel group including at least one pixel corresponding to each of the at least one pixel included in the first pixel group from an input depth image; calculating a transformation function of the first pixel group and second pixel group based on a coordinate value of each of the at least one pixel included in the first pixel group and a coordinate value of each of the at least one pixel included in the second pixel group; and matching each pixel of the input color image with each pixel of the input depth image based on the transformation function.

According to further embodiment of the present invention, there is provided a computer-readable recording medium having stored thereon instruction sets for implementing the image processing method.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Figure 1:
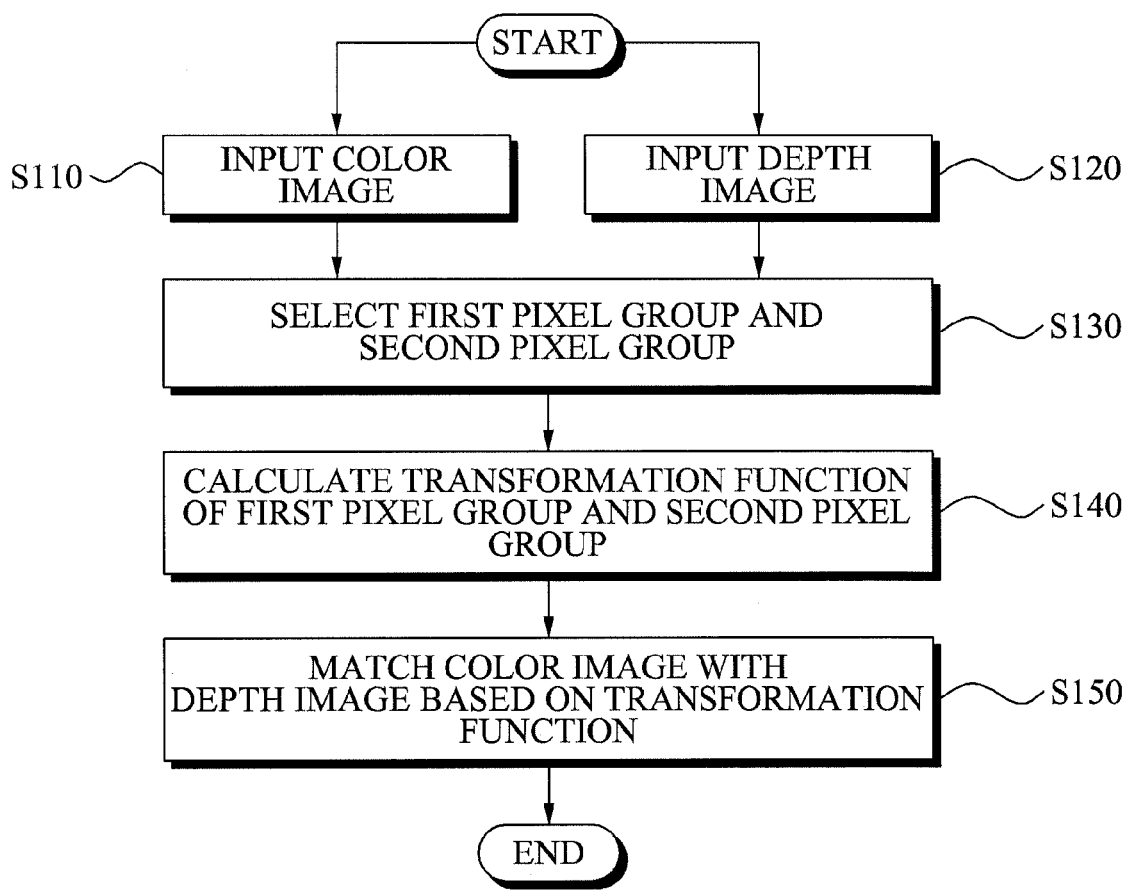
FIG. 1 is a flowchart illustrating an image processing method according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a flowchart illustrating an image processing method according to an embodiment of the present invention.

In operation S110, a color image is inputted. The color image may be obtained by a Charged Coupled Device (CCD) or Complementary Metal-Oxide-Semiconductor (CMOS)-based camera.

In operation S120, a depth image is inputted. The depth image may be obtained by a depth camera.

In operation S130, a first pixel group and second pixel group are selected. The first and second pixel groups correspond to each other. A feature point detection algorithm is applied to the color image inputted in operation S110. According to an aspect of the present invention, the feature detection algorithm is a corner detection algorithm. The corner detection falls within the scope of an interest point detection. Also, the corner detection detects feature points of an image using computer vision technology, and may be provided by Harris corner detection operator (or Harris operator). The first pixel group including at least one pixel is selected by applying the corner detection algorithm.

Also, the corner detection algorithm is applied to the inputted depth image, and the second pixel group including at least one pixel is selected from the detected feature points. The second pixel group may include the same number of pixels as the first pixel group.

In operation S140, a transformation function of the first and second pixel groups is calculated. The transformation function may perform transformation of each pixel of the inputted color image and each pixel of the inputted depth image. When a coordinate of each of the pixels of the color image is (xc, yc), a coordinate of each of the pixels of the depth image is (xd, yd, zd), and the transformation function is f, the transformation function f, where (xc, yc) f(xd, yd, zd), may be calculated.

According to an aspect of the present invention, information about the coordinate of each of the pixels and transformation function may be represented as a matrix operation. The at least one pixel included in the first pixel group corresponds to the color image, and a coordinate of each of the at least one pixel may be represented as $Xc=[xc, yc, 1]^T$. Also, the at least one pixel included in the second pixel group corresponds to the depth image, and a coordinate of each of the at least one pixel may be represented as $Xd=[xd, yd, zd, 1]^T$. Accordingly, a transformation matrix with respect to six pixels of the first pixel group and six pixels of the second pixel group corresponding to the six pixels of the first pixel group may be calculated.

According to an aspect of the present invention, when a matrix on a left side and a matrix on a right side are linear, the transformation matrix may be calculated using a Direct Linear Transformation (DLT) algorithm.

In operation S150, the color image is matched with the depth image using the transformation function. The transformation function (or transformation matrix) calculated in operation S140 is applied to each of the pixels of the inputted depth image. Transformation such as parallel translation, rotation, projection, and the like may be performed depending on a characteristic of the transformation function.

According to an aspect of the present invention, when a resolution of the inputted color image is not identical to that of the inputted depth image, for example, when the resolution of the inputted color image is less than that of the inputted depth image, an Interpolation is applied to the inputted depth image. Accordingly, the pixels of the inputted depth image may be provided to the pixels of the inputted color image that may not be matched with the pixels of the inputted depth image prior to the Interpolation. Thus, in operation S150, each of the pixels of the inputted depth image may correspond to each of the pixels of the inputted color image. In this instance, each of the pixels of the inputted depth image includes pixels newly generated by applying the Interpolation. The corresponding relationship may be used for three-dimensional (3D) modeling of an object.

Figure 2:
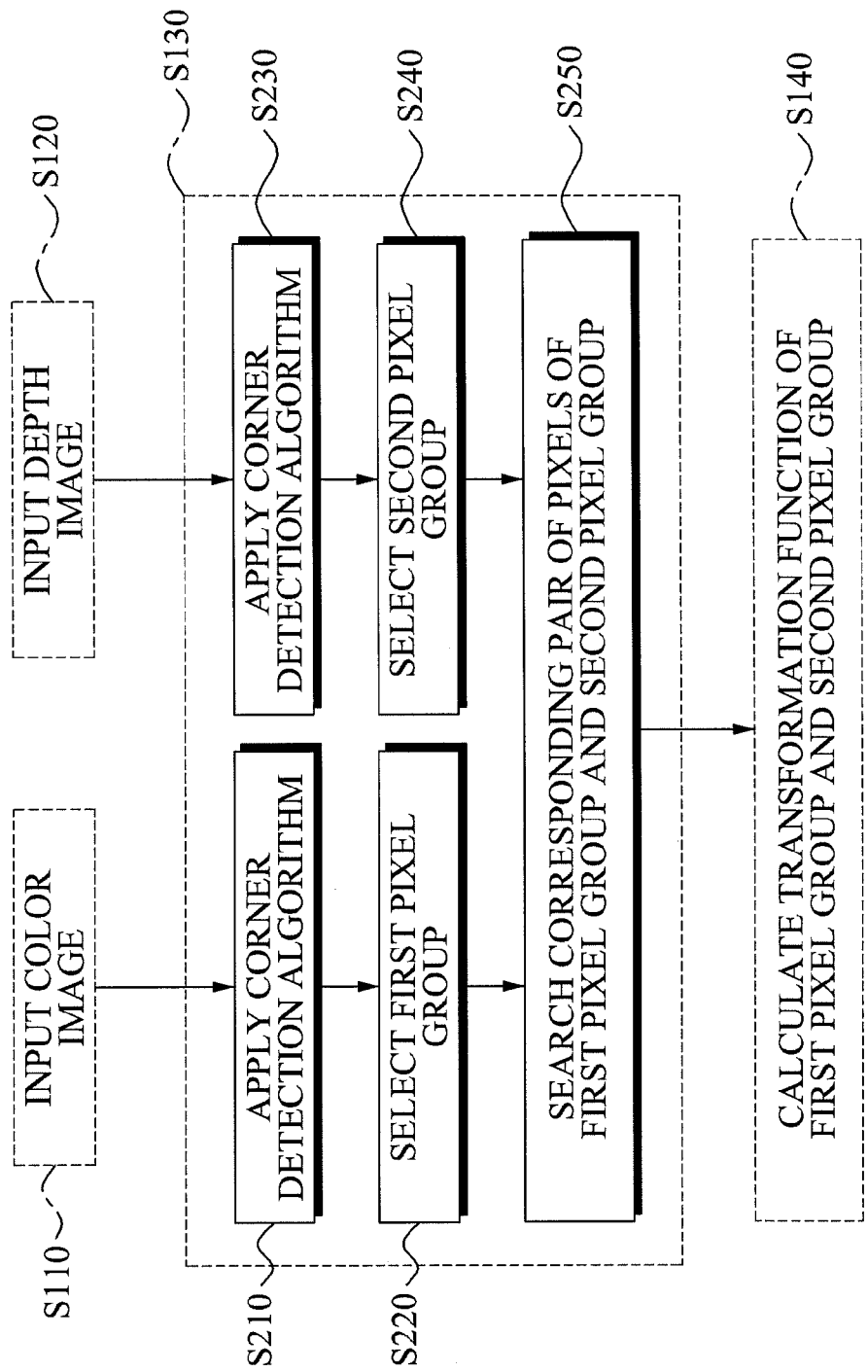
FIG. 2 is a flowchart illustrating an operation of selecting first and second pixel groups corresponding to each other according to an embodiment of the present invention.

FIG. 2 is a flowchart illustrating an operation of selecting first and second pixel groups corresponding to each other in operation S130 of FIG. 1.

In operation S210, the feature detection algorithm is applied to the color image inputted in operation S110. According to an aspect of the present invention, the feature detection algorithm is the corner detection algorithm.

The corner detection falls within the scope of an interest point detection, and detects features of an image using a computer vision technology. According to an aspect of the present invention, the corner detection algorithm is applied to the inputted color image, and the detected corner points may be used for image matching.

The corner detection algorithm may be provided by Harris corner detection. The Harris corner detection may be referred to as Harris & Stephens/Plessey corner detection algorithm. In the Harris corner detection, a corner score is calculated with respect to pixels of an inputted image, a rate of change based on direction of the corner score is measured, and it is determined whether a specific pixel is located in a corner.

In operation S220, the first pixel group including the at least one pixel is selected. An x coordinate value, xc, of the at least one pixel included in the first pixel group and a y coordinate value, yc, of the at least one pixel included in the second pixel group are stored. According to an aspect of the present invention, the first pixel group includes six pixels to match a pixel of the color image with a pixel of the depth image. In this instance, the pixel of the color image has the x coordinate value, xc, and the y coordinate value, yc, and the pixel of the depth image has an x coordinate value, xd, y coordinate value, yd, and z coordinate value, zd.

In operation S230, the feature detection algorithm is applied to the depth image inputted in operation S120. The feature detection algorithm may be the corner detection algorithm.

In operation S240, the second pixel group including the at least one pixel is selected from the detected features. According to an aspect of the present invention, the second pixel group has the same number of pixels as the first pixel group to match each pixel of the depth image with each pixel of the color image. Accordingly, the second pixel group may include six pixels.

In operation S250, each of the at least one pixel included in the first pixel group and each of the at least one pixel included in the second pixel group may be matched as a corresponding pair. According to an aspect of the present invention, each of the six pixels selected in operation S220 corresponds to each of the six pixels selected in operation S240. The corresponding pair may be obtained by matching the pixels included in the first pixel group with the pixels included in the second pixel group based on a similarity of surrounding areas of the pixels included in the first pixel group and the pixels included in the second pixel group. Accordingly, six corresponding pairs including the pixels included in the first pixel group and the pixels included in the second pixel group may be obtained.

The similarity of the surrounding areas may be associated with a similarity degree of edge information of the color and depth images. Specifically, windowing is performed around the pixels included in the first pixel group and the pixels included in the second pixel group, a gradient value is calculated, and a pair of pixels with similar gradient values may be matched. Also, a Random Sample Consensus (RANSAC)-based algorithm may be applied when obtaining the corresponding pairs.

Figure 3:
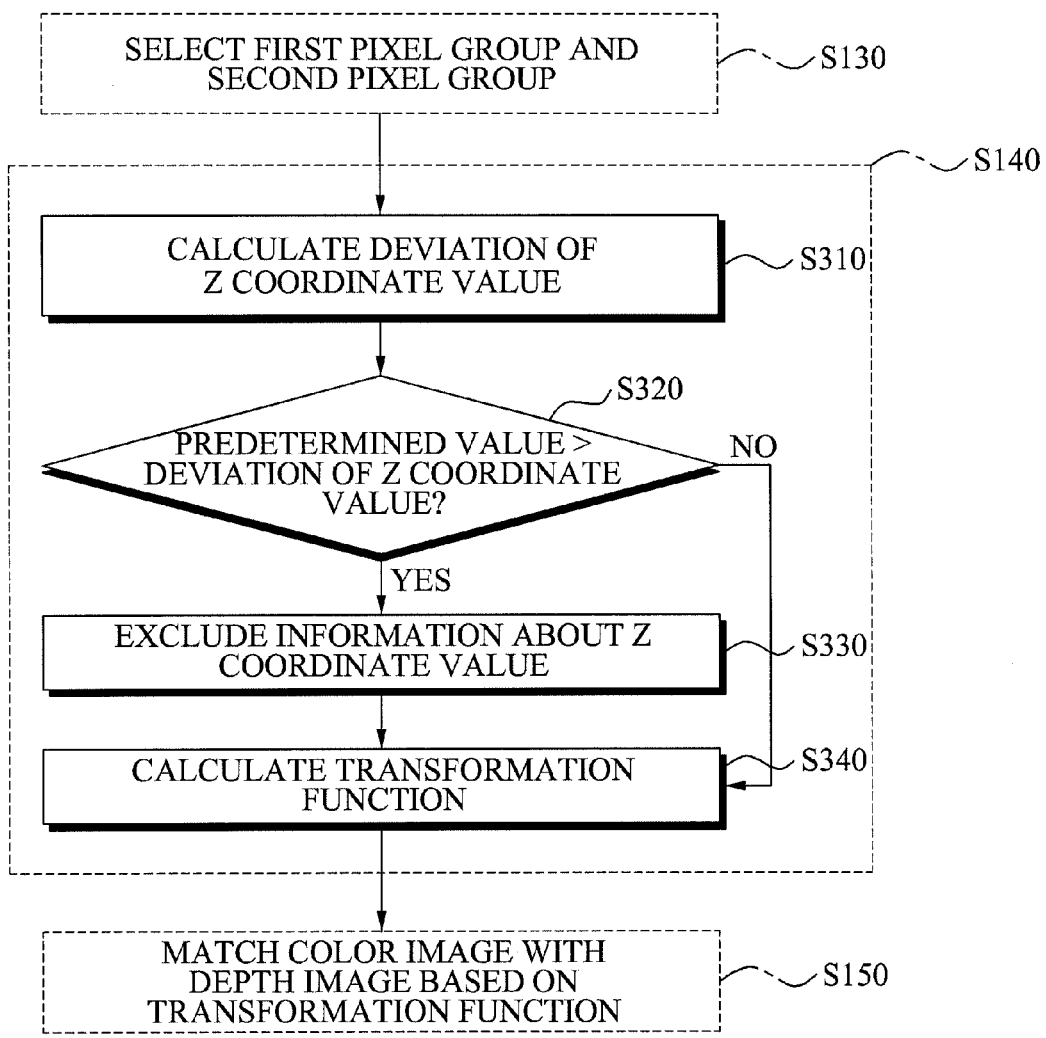
FIG. 3 is a flowchart illustrating an operation of calculating a transformation function of a first pixel group and second pixel group according to an embodiment of the present invention.

FIG. 3 is a flowchart illustrating an operation of calculating a transformation function of first and second pixel groups in operation S140 of FIG. 1.

In operation S310, a deviation of the z coordinate value, zd, of each of the pixels included in the second pixel group is calculated. Each of the pixels included in the second pixel group corresponds to 3D geometry information of an object, and thus each of the pixels may be coordinated as an x coordinate value, xd, y coordinate value, yd, and z coordinate value, zd. According to an aspect of the present invention, the deviation of the z coordinate value corresponding to a vertical direction of each of the pixels included in the second pixel group is calculated.

In operation S320, it is determined whether the deviation of the z coordinate value is less than a predetermined value. For example, it is determined whether the deviation of the z coordinate value is less than 10% of a smaller value from among a deviation of the x coordinate value and a deviation of the y coordinate value.

In operation S330, when the deviation of the z coordinate value is less than the predetermined value, the z coordinate value is excluded from the pixels included in the corresponding pairs. Specifically, while matching the inputted color image with the inputted depth image, the z coordinate value, zd, of the depth image is excluded. That is, when the deviation of the z coordinate value is less than the predetermined value, ignoring the z coordinate value may not significantly affect an entire operation, and may reduce complexity and increase linearity. Also, in operation S320, when it is determined that the deviation of the z coordinate value is equal to or greater than the predetermined value, calculating in operation S340 is preformed without the excluding in operation S330.

In operation S340, a transformation function is calculated. The transformation function is associated with information about matching for transformation between each pixel of the inputted color image and each pixel of the inputted depth image. When the transformation function is f, the transformation function f, where (xc, yc)=f(xd, yd, zd), may be calculated.

According to an aspect of the present invention, information about the coordinate of each of the pixels and transformation function may be represented as a matrix operation. The at least one pixel included in the first pixel group corresponds to the color image, and a coordinate of each of the at least one pixel may be represented as $Xc=[xc, yc, 1]^T$. Also, the at least one pixel included in the second pixel group corresponds to the depth image, and a coordinate of each of the at least one pixel may be represented as $Xd=[xd, yd, zd, 1]^T$. Accordingly, when six pixels of the first pixel group and six pixels of the second pixel group corresponding to the six pixels of the first pixel group exist, a transformation matrix P with dimensions of 3×4 may be calculated as, $$\begin{bmatrix} s \cdot xc \\ s \cdot yc \\ s \end{bmatrix} = P \begin{bmatrix} xd \\ yd \\ zd \\ 1 \end{bmatrix} \quad \text{[Equation 1]}$$

where s is a homogeneous component for conversion into a two-dimensional (2D) image. The transformation matrix P includes information about 3D rotation, 3D translation, 3D scaling, and 3D projection.

According to an aspect of the present invention, since a matrix on a left side and a matrix on a right side are linear, the transformation matrix P may be calculated using a DLT algorithm.

According to an aspect of the present invention, when the z coordinate value is excluded in operation S330, a transformation matrix P may be calculated as, $$\begin{bmatrix} s \cdot xc \\ s \cdot yc \\ s \end{bmatrix} = P \begin{bmatrix} xd \\ yd \\ 1 \end{bmatrix} \quad \text{[Equation 2]}$$

where s is a scaling factor. Here, the transformation matrix P with dimensions of 3×3 is a homography transformation matrix between two 3D planes.

In this case, to calculate the transformation matrix P, only four pixels of the first pixel group and four pixels of the second group corresponding to the four pixels of the first group are required. Accordingly, only four corresponding pairs of the six corresponding pairs are used. When the matrix on the left side and matrix on the right side in Equation 2 are linear, the transformation matrix P may be calculated using the DLT algorithm.

As long as viewpoints of a depth camera, and CCD or CMOS camera are fixed, the transformation function or transformation matrix may not change since a spatial viewpoint difference is fixed. In this instance, the depth camera may obtain the inputted depth image, and the CCD or CMOS camera may obtain the inputted color image. Accordingly, the transformation function or transformation matrix may be used again when modeling another object.

Figure 4:
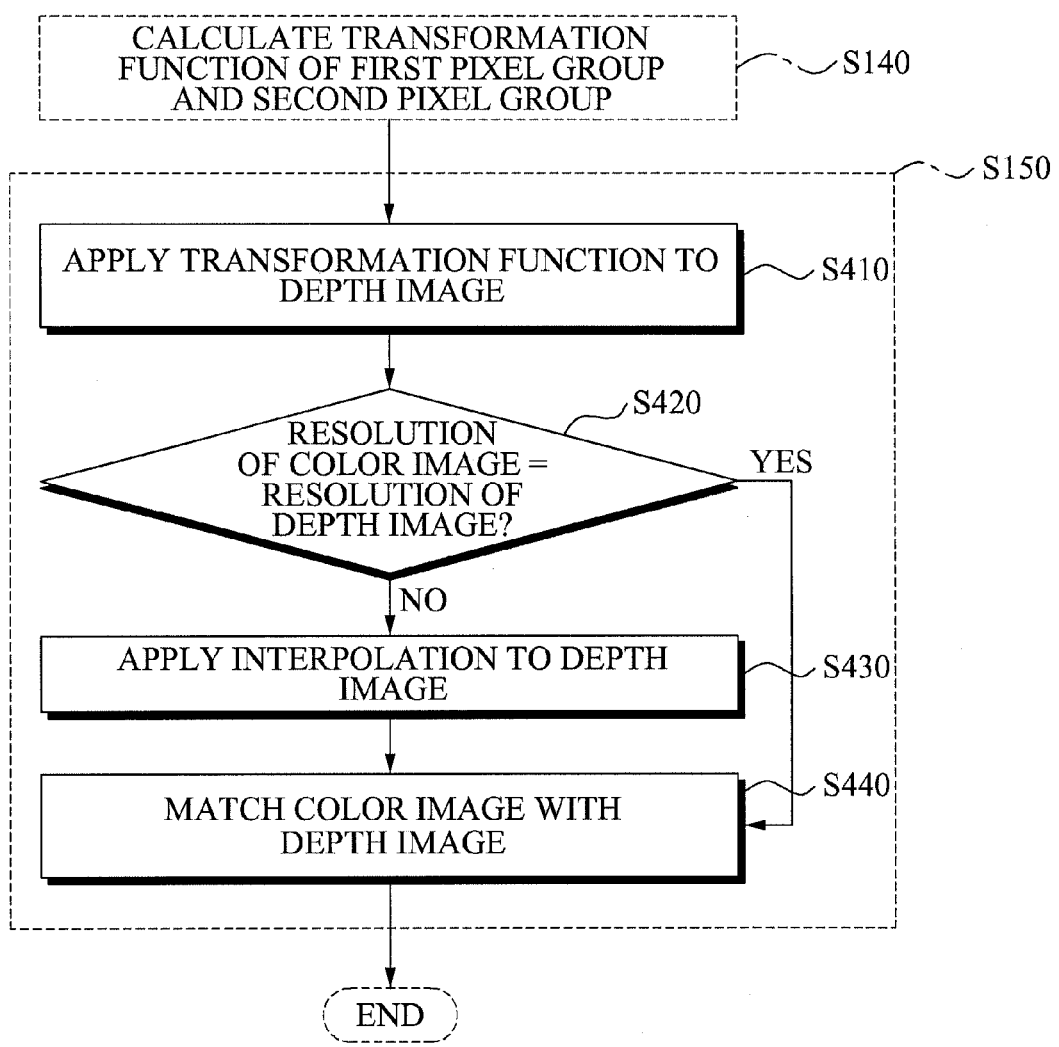
FIG. 4 is a flowchart illustrating an operation of matching color and depth images using a transformation function according to an embodiment of the present invention.

FIG. 4 is a flowchart illustrating an operation of matching color and depth images using a transformation function in operation S150 of FIG. 1.

In operation S410, the transformation function (or transformation matrix) is applied to each of the pixels of the inputted depth image. Transformation such as parallel translation, rotation, projection, and the like may be performed depending on a characteristic of the transformation function.

In operation S420, it is determined whether a resolution of the inputted color image is identical to that of the inputted depth image. As described above, in general, the resolution of the inputted color image is different from that of the inputted depth image due to a factor in hardware. When the resolution of the inputted color image is different from that of the inputted depth image, applying an Interpolation in operation S430 is performed. When the resolution of the inputted color image is identical to that of the inputted depth image, matching in operation S440 is performed without applying the Interpolation in operation S430.

In operation S430, when the resolution of the inputted depth image is less than that of the inputted color image, the Interpolation is applied to the inputted depth image. Accordingly, the pixels of the inputted depth image may be provided to the pixels of the inputted color image that may not be matched with the pixels of the inputted depth image prior to the Interpolation.

In operation S440, the inputted depth image is matched with the inputted color image. In this instance, each of the pixels of the inputted depth image may correspond to each of the pixels of the inputted color image. Here, each of the pixels of the inputted depth image includes pixels newly generated by applying the Interpolation. The corresponding relationship may be used for 3D modeling of an object.

Figure 5:
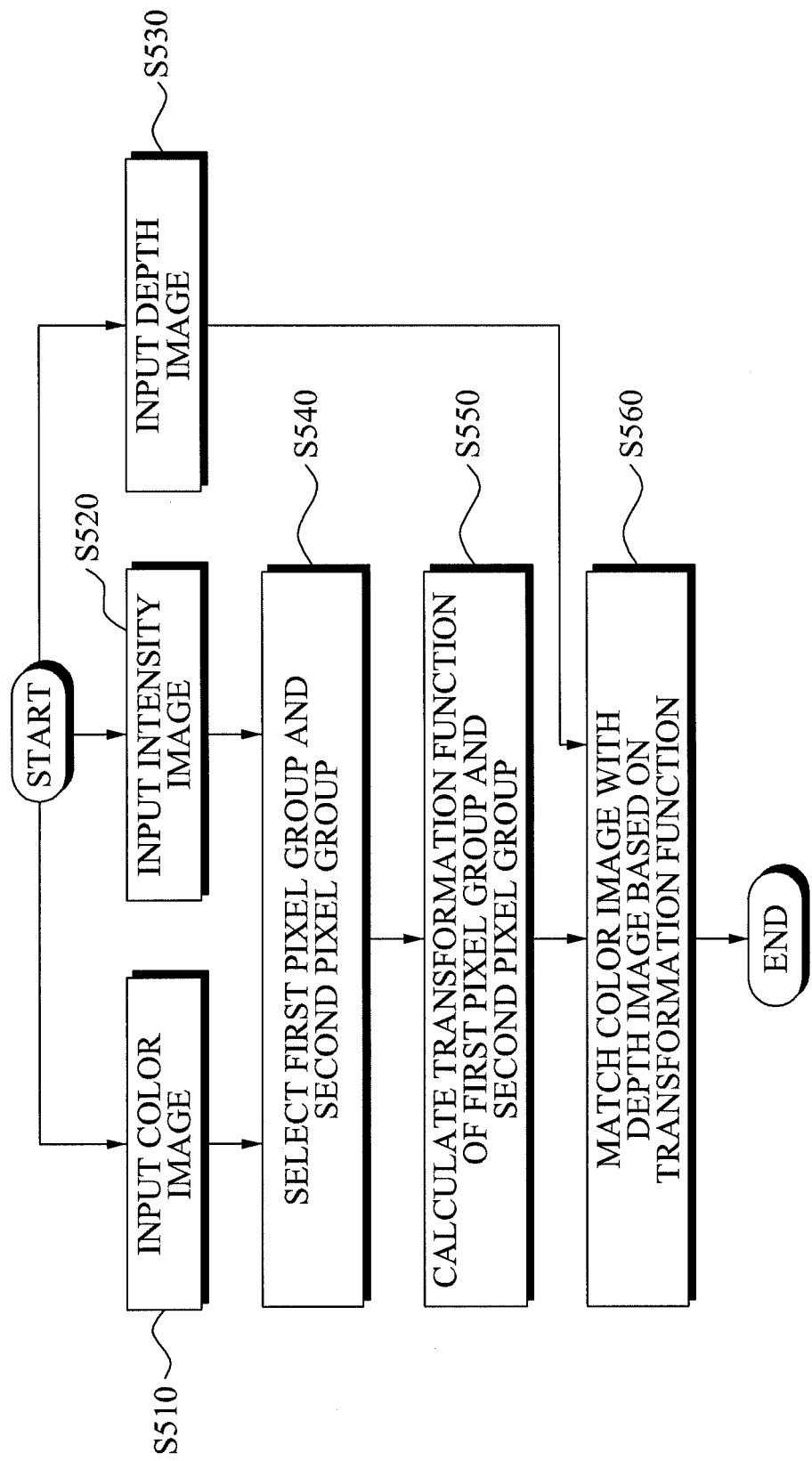
FIG. 5 is a flowchart illustrating an image processing method according to another embodiment of the present invention.

FIG. 5 is a flowchart illustrating an image processing method according to another embodiment of the present invention.

In operation S510, a color image is inputted. The color image may be obtained from a CCD or CMOS-based camera.

In operation S520, an intensity image is inputted. The intensity image may be incidentally obtained by intensity sensed by a sensor, as opposed to a Time of Flight (TOF), while obtaining a depth image from a depth camera.

In operation S530, the depth image is inputted. The depth image is matched with the intensity image inputted in operation S520. A viewpoint of the depth image is identical to that of the intensity image, and a resolution of the depth image is identical to that of the intensity image.

According to an aspect of the present invention, a transformation function may be calculated based on first and second pixel groups, detected from the color image and intensity image, respectively, unlike the image processing method of FIG. 1. Accordingly, the depth image inputted in operation S530 is not used to calculate the transformation function.

In operation S540, the first and second pixel groups corresponding to each other are selected. A feature detection algorithm is applied to the color image inputted in operation S510. According to an aspect of the present invention, the feature detection algorithm is a corner detection algorithm. The corner detection may be provided by Harris corner detection. The first pixel group including at least one pixel is selected by applying the corner detection algorithm.

Also, the second pixel group including at least one pixel is selected from the detected feature points by applying the corner detection algorithm to the inputted intensity image. The second pixel group may include the same number of pixels as the first pixel group.

In operation S550, a transformation function of the first and second pixel groups is calculated. The transformation function is for transformation between each pixel of the inputted color image and each pixel of the inputted depth image. When a coordinate of each of the pixels of the color image is (xc, yc), a coordinate of each of the pixels of the depth image is (xd, yd, zd), and the transformation function is f, the transformation function f, where (xc, yc)=f(xd, yd, zd), may be calculated.

According to an aspect of the present invention, information about the coordinate of each of the pixels and transformation function may be represented as a matrix operation. The at least one pixel included in the first pixel group corresponds to the color image, and a coordinate of each of the at least one pixel may be represented as $Xc=[xc, yc, 1]^T$. Also, the at least one pixel included in the second pixel group corresponds to the intensity image, and a coordinate of each of the at least one pixel may be represented as $Xd=[xi, yi, zi, 1]^T$. Accordingly, a transformation matrix with respect to six pixels of the first pixel group and six pixels of the second pixel group corresponding to the six pixels of the first pixel group may be calculated.

According to an aspect of the present invention, when a matrix on a left side and a matrix on a right side are linear, the transformation matrix may be calculated using a DLT algorithm.

According to an aspect of the present invention, before calculating in operation S550, it is determined whether a deviation of the z coordinate value, zd, of each of the pixels included in the second pixel group is less than a predetermined value. For example, it is determined whether the deviation of the z coordinate value is less than 10% of a smaller value from among a deviation of the x coordinate value and a deviation of the y coordinate value. When the deviation of the z coordinate value is less than the predetermined value, the z coordinate value is excluded when the transformation matrix is calculated. Ignoring the z coordinate value may not significantly affect an entire operation, and may reduce complexity and increase linearity. When it is determined that the deviation of the z coordinate value is equal to or greater than the predetermined value, the transformation function is calculated based on the z coordinate value. The transformation function is associated with information about matching for transformation between each pixel of the inputted color image and each pixel of the inputted depth image. When the transformation function is f, the transformation function f, where (xc, yc)=f(xd, yd, zd), may be calculated.

As described with reference to operation S340 of FIG. 3, the transformation function f may be a transformation matrix P. When linearity is guaranteed, the transformation matrix P may be calculated using a DLT algorithm.

In operation S560, the inputted depth image is matched with the inputted color image using the transformation function. According to an aspect of the present invention, the transformation function (or transformation matrix) calculated in operation S550 is applied to each of the pixels of the depth image inputted in operation S530. Transformation such as parallel translation, rotation, projection, and the like may be performed depending on a characteristic of the transformation function.

According to an aspect of the present invention, when a resolution of the inputted color image is not identical to that of the inputted depth image, for example, when the resolution of the inputted depth image is less than that of the inputted color image, an Interpolation is applied to the inputted depth image. Accordingly, the pixels of the inputted depth image may be provided to the pixels of the inputted color image that may not be matched with the pixels of the inputted depth image prior to the Interpolation. Thus, in operation S560, each of the pixels of the inputted depth image may correspond to each of the pixels of the inputted color image. In this instance, each of the pixels of the inputted depth image includes pixels newly generated by applying the Interpolation. The corresponding relationship may be used for 3D modeling of an object.

Figure 6:
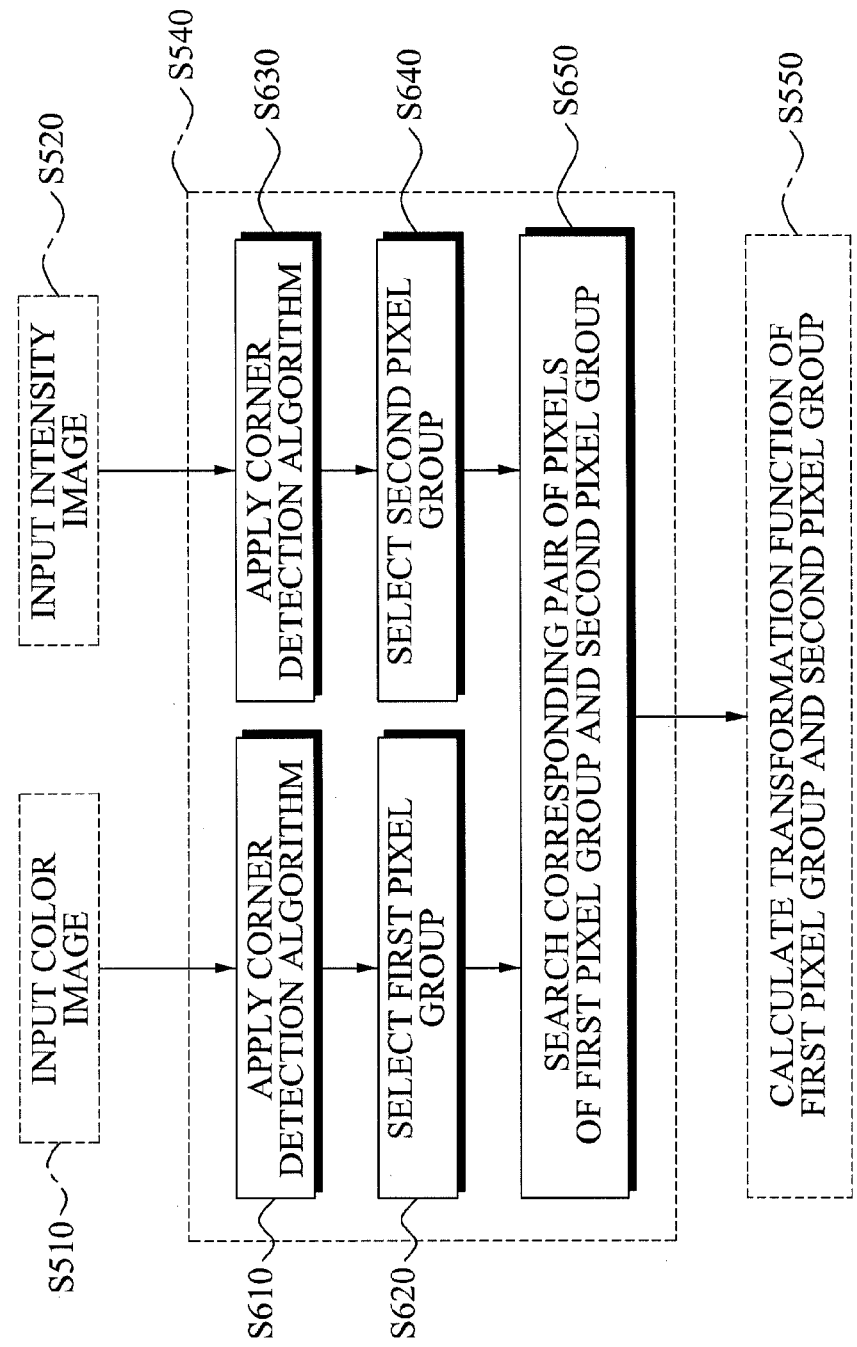
FIG. 6 is a flowchart illustrating an operation of selecting first and second pixel groups corresponding to each other according to an embodiment of the present invention.

FIG. 6 is a flowchart illustrating an operation of selecting first and second pixel groups corresponding to each other in operation S540 of FIG. 5.

In operation S610, a feature detection algorithm is applied to the color image inputted in operation S510. According to an aspect of the present invention, the feature detection algorithm is a corner detection algorithm.

The corner detection falls within the scope of an interest point detection, and detects features of an image using a computer vision technology. According to an aspect of the present invention, the features detected by applying the corner detection algorithm to the inputted color image may be used for basic information for image matching. Also, according to an aspect of the present invention, the corner detection algorithm may be provided by Harris corner detection.

In operation S620, a first pixel group including the at least one pixel is selected. The first pixel group is the detected feature point. An x coordinate value, xc, of the at least one pixel included in the first pixel group and a y coordinate value, yc, of the at least one pixel included in the second pixel group are stored. According to an aspect of the present invention, the first pixel group includes six pixels to match a pixel of the color image with a pixel of the depth image (or a pixel of the intensity image corresponding to the depth image). In this instance, the pixel of the color image has the x coordinate value, xc, and the y coordinate value, yc, and the pixel of the depth image has the x coordinate value, xd, y coordinate value, yd, and z coordinate value, zd. Also, the pixel of the intensity image has an x coordinate value, xi, y coordinate value, yi, and z coordinate value, zi.

In operation S630, the feature detection algorithm is applied to the intensity image inputted in operation S520. The feature detection algorithm may be the corner detection algorithm.

In operation S640, the second pixel group including at least one pixel is selected from the detected features. According to an aspect of the present invention, the second pixel group has the same number of pixels as the first pixel group to match each pixel of the depth image with each pixel of the color image. Accordingly, the second pixel group may include six pixels.

In operation S650, each of the at least one pixel included in the first pixel group and each of the at least one pixel included in the second pixel group may be matched as a corresponding pain. According to an aspect of the present invention, each of the six pixels selected in operation S620 corresponds to each of the six pixels selected in operation S640. The corresponding pair may be obtained by matching the pixels included in the first pixel group with the pixels included in the second pixel group based on a similarity of surrounding areas of the pixel included in the first pixel group and the pixels included in the second pixel group. Accordingly, six corresponding pairs including the pixels included in the first pixel group and the pixels included in the second pixel group may be obtained.

The similarity of the surrounding areas may be associated with a similarity degree of edge information of the color and depth images. Specifically, windowing is performed around the pixels included in the first pixel group and the pixels included in the second pixel group, a gradient value is calculated, and a pair of pixels with similar gradient values may be matched. Also, a RANSAC-based algorithm may be applied when obtaining the corresponding pairs.

Figure 7:
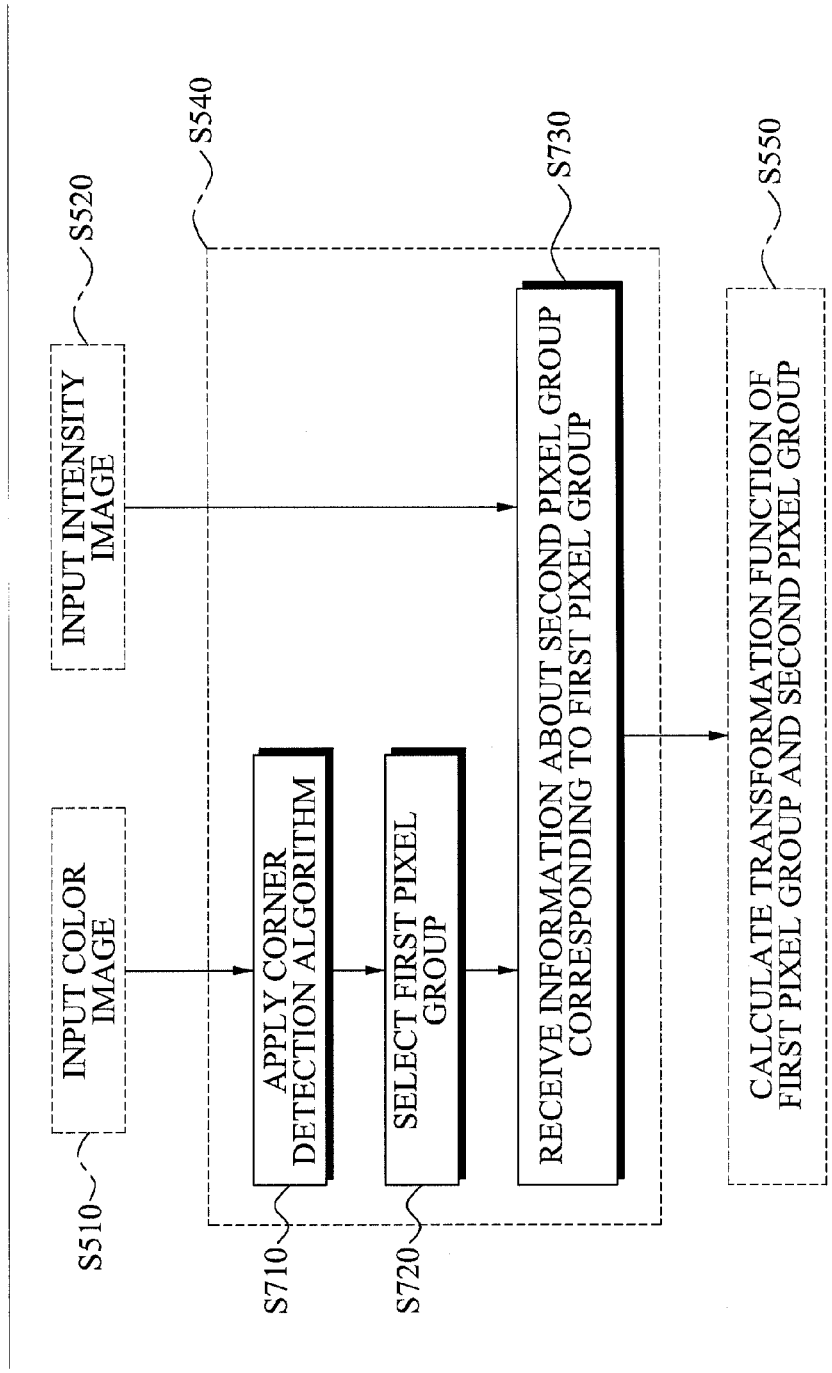
FIG. 7 is a flowchart illustrating an operation of selecting first and second pixel groups corresponding to each other according to an embodiment of the present invention.

FIG. 7 is a flowchart illustrating an operation of selecting first and second pixel groups corresponding to each other in operation S540 of FIG. 5.

In operation S710, a feature detection algorithm is applied to the color image inputted in operation S810. According to an aspect of the present invention, the feature detection algorithm is a corner detection algorithm.

The corner detection falls within the scope of an interest point detection, and detects features of an image using a computer vision technology. According to an aspect of the present invention, the features detected by applying the corner detection algorithm to the inputted color image may be used for basic information for image matching. Also, according to an aspect of the present invention, the corner detection algorithm may be provided by Harris corner detection.

In operation S720, a first pixel group including the at least one pixel is selected. The first pixel group is the detected feature. An x coordinate value, xc, of the at least one pixel included in the first pixel group and a y coordinate value, yc, of the at least one pixel included in the second pixel group are stored. According to an aspect of the present invention, the first pixel group includes a predetermined number of pixels to match a pixel of the color image with a pixel of the depth image (or a pixel of the intensity image corresponding to the depth image). In this instance, the pixel of the color image has the x coordinate value, xc, and the y coordinate value, yc, and the pixel of the depth image has the x coordinate value, xd, y coordinate value, yd, and z coordinate value, zd. Also, the pixel of the intensity image has an x coordinate value, xi, y coordinate value, yi, and z coordinate value, zi. The predetermined number is a natural number, and the natural number may be six, similar to operation S620 of FIG. 6.

In operation S730, information about the second pixel group corresponding to the first pixel group from among pixels of the intensity image inputted in operation S520 of FIG. 5 is received. According to an aspect of the present invention, the second pixel group is not selected from the intensity image using a particular algorithm. That is, the second pixel group is selected by received information.

According to an aspect of the present invention, a number of pixels, included in the second pixel group selected based on the information received in operation S730, is identical to a number of first pixel group. According to an aspect of the present invention, the information about corresponding pairs of the first and second pixel groups is also received.

Figure 8:
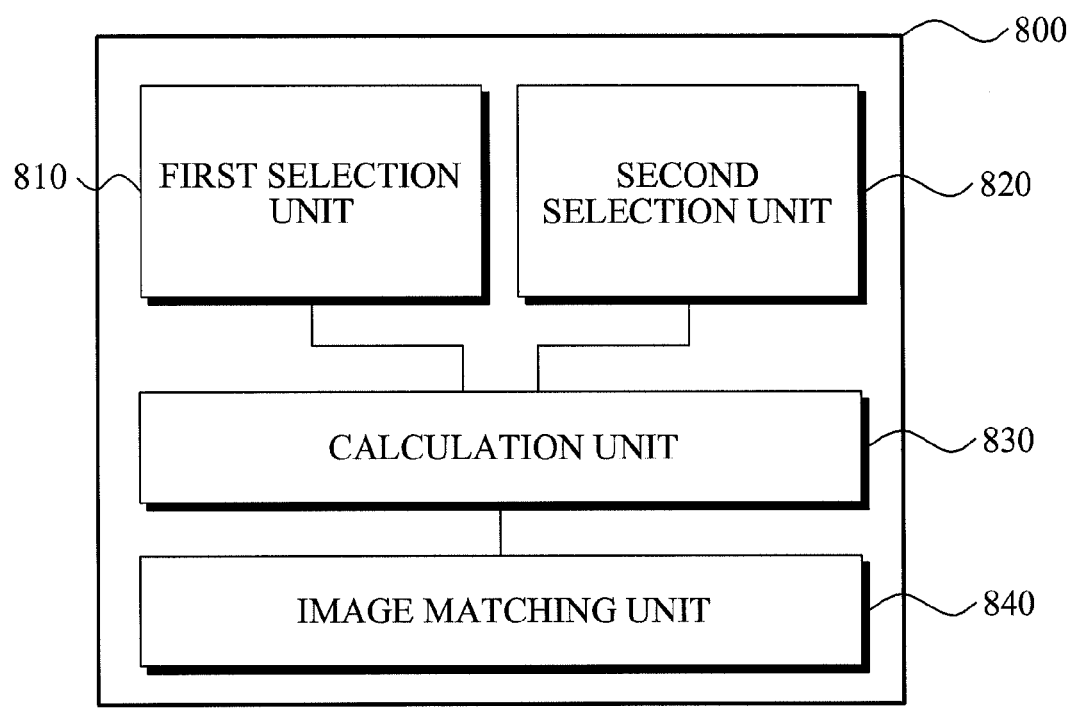
FIG. 8 is a block diagram illustrating an image processing apparatus 800 according to an embodiment of the present invention.

FIG. 8 is a block diagram illustrating an image processing apparatus 800 according to an embodiment of the present invention.

The image processing apparatus 800 may include a first selection unit 810, second selection unit 820, calculation unit 830, and image matching unit 840.

The first selection unit 810 applies a feature detection algorithm to an inputted color image. According to an aspect of the present invention, the feature detection algorithm is a corner detection algorithm.

The corner detection falls within the scope of an interest point detection, and detects features of an image using a computer vision technology. According to an aspect of the present invention, the corner detection algorithm is applied to the inputted color image, and the detected corner points may be used for image matching.

The corner detection algorithm may be provided by Harris corner detection. The Harris corner detection may be referred to as Harris & Stephens/Plessey corner detection algorithm. In the Harris corner detection, a corner score is calculated with respect to pixels of an inputted image, a rate of change based on direction of the corner score is measured, and it is determined whether a specific pixel is located in a corner.

Also, the first selection unit 810 selects a first pixel group including at least one pixel. An x coordinate value, xc, of the at least one pixel included in the first pixel group and a y coordinate value, yc, of the at least one pixel included in the second pixel group are stored. According to an aspect of the present invention, the first pixel group includes six pixels to match a pixel of the color image with a pixel of the depth image. In this instance, the pixel of the color image has the x coordinate value, xc, and the y coordinate value, yc, and the pixel of the depth image has an x coordinate value, xd, y coordinate value, yd, and z coordinate value, zd.

The second selection unit 820 applies a feature detection algorithm to an inputted depth image. The feature detection algorithm may be the corner detection algorithm.

Also, the second selection unit 820 selects a second pixel group including at least one pixel. According to an aspect of the present invention, the second pixel group has the same number of pixels as the first pixel group to match each pixel of the depth image with each pixel of the color image. Accordingly, the second pixel group may include six pixels.

According to an aspect of the present invention, the second selection unit 820 applies the feature detection algorithm to an inputted intensity image. The intensity image may be incidentally obtained by intensity sensed by a sensor, as opposed to a TOF, while obtaining the depth image from a depth camera. Also, the inputted depth image is matched with the inputted intensity image. A viewpoint of the depth image is identical to that of the intensity image, and a resolution of the depth image is identical to that of the intensity image.

According to an aspect of the present invention, the second selection unit 820 applies the feature detection algorithm to the inputted intensity image, and selects a second pixel group including at least one pixel from the detected feature points. The second pixel group may include the same number of pixels as the first pixel group.

Also, according to another aspect of the present invention, the second selection unit 820 may select the second pixel group based on information received from outside the image processing apparatus 800.

The calculation unit 830 matches each of the at least one pixel included in the first pixel group with each of the at least one pixel included in the second pixel group as a corresponding pair. According to an aspect of the present invention, each of the six pixels selected by the first selection unit 810 corresponds to each of the six pixels selected by the second selection unit 820. The corresponding pair may be obtained by matching the pixels included in the first pixel group with the pixels included in the second pixel group based on a similarity of surrounding areas of the pixels included in the first pixel group and the pixels included in the second pixel group. Accordingly, six corresponding pairs including the pixels included in the first pixel group and the pixels included in the second pixel group may be obtained.

The similarity of the surrounding areas may be associated with a similarity degree of edge information of the color and depth images. Specifically, windowing is performed around the pixels included in the first pixel group and the pixels included in the second pixel group, a gradient value is calculated, and a pair of pixels with similar gradient values may be matched. Also, a Random Sample Consensus (RANSAC)-based algorithm may be applied when obtaining the corresponding pairs.

Also, the calculation unit 830 calculates a deviation of the z coordinate value, zd, of each of the pixels included in the second pixel group. Each of the pixels included in the second pixel group corresponds to 3D geometry information of an object, and thus each of the pixels may be coordinated as an x coordinate value, xd, y coordinate value, yd, and z coordinate value, zd. According to an aspect of the present invention, the deviation of the z coordinate value corresponding to a vertical direction of each of the pixels included in the second pixel group is calculated.

Also, the calculation unit 830 determines whether the deviation of the z coordinate value is less than a predetermined value. For example, it is determined whether the deviation of the z coordinate value is less than 10% of a smaller value from among a deviation of the x coordinate value and a deviation of the y coordinate value.

When the deviation of the z coordinate value is less than the predetermined value, the calculation unit 830 excludes the z coordinate value from the pixels included in the corresponding pairs. Specifically, while matching the inputted color image with the inputted depth image, the z coordinate value, zd, of the depth image is excluded. That is, when the deviation of the z coordinate value is less than the predetermined value, ignoring the z coordinate value may not significantly affect an entire operation, and may reduce complexity and increase linearity.

When the calculation unit 830 determines that the deviation of the z coordinate value is equal to or greater than the predetermined value, the z coordinate value, zd, of the depth image is not excluded.

Also, the calculation unit 830 calculates a transformation function. The transformation function is associated with information about matching for transformation between each pixel of the inputted color image and each pixel of the inputted depth image. When the transformation function is f, the transformation function f, where (xc, yc)=f(xd, yd, zd), may be calculated.

According to an aspect of the present invention, information about the coordinate of each of the pixels and transformation function may be represented as a matrix operation. The at least one pixel included in the first pixel group corresponds to the color image, and a coordinate of each of the at least one pixel may be represented as $Xc=[xc, yc, 1]^T$. Also, the at least one pixel included in the second pixel group corresponds to the depth image, and a coordinate of each of the at least one pixel may be represented as $Xd=[xd, yd, zd, 1]^T$. Accordingly, when six pixels of the first pixel group and six pixels of the second pixel group corresponding to the six pixels of the first pixel group exist, a transformation matrix P of Equation 1 may be calculated.

According to an aspect of the present invention, since a matrix on a left side and a matrix on a right side are linear, the transformation matrix P may be calculated using a DLT algorithm.

Also, according to an aspect of the present invention, when the z coordinate value is excluded, a transformation matrix P of Equation 2 may be calculated.

The image matching unit 840 matches the depth image with the color image using the transformation function.

The image matching unit 840 may perform a transformation such as parallel translation, rotation, projection, and the like depending on a characteristic of the transformation function.

The image matching unit 840 determines whether a resolution of the inputted color image is identical to that of the inputted depth image. As described above, in general, the resolution of the inputted color image is different from that of the inputted depth image due to a factor in hardware.

When the resolution of the inputted color image is different from that of the inputted depth image, for example, when the resolution of the inputted depth image is less than that of the inputted color image, the Interpolation is applied to the inputted depth image. Accordingly, the pixels of the inputted depth image may be provided to the pixels of the inputted color image that may not be matched with the pixels of the inputted depth image prior to the Interpolation.

When the resolution of the inputted color image is identical to that of the inputted depth image, the Interpolation is not applied.

Also, the image matching unit 840 matches the inputted depth image with the inputted color image. In this instance, each of the pixels of the inputted depth image may correspond to each of the pixels of the inputted color image. Here, each of the pixels of the inputted depth image includes pixels newly generated by applying the Interpolation. The corresponding relationship may be used for 3D modeling of an object.

The image processing method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents

What is claimed is:

1. An image processing apparatus, comprising:
a computer comprising:
a first selection unit to select a first pixel group including at least one pixel from an input color image;
a second selection unit to select a second pixel group including at least one pixel, corresponding to each of the at least one pixel included in the first pixel group, from an input depth image, the input depth image comprising geometry information;
a calculation unit to calculate a transformation function of the first pixel group and second pixel group based on a coordinate value of each of the at least one pixel included in the first pixel group and a coordinate value of each of the at least one pixel included in the second pixel group; and
an image matching unit to match each pixel of the input color image with each pixel of the input depth image based on the transformation function,
wherein the transformation function is a transformation matrix obtained by using a Direct Linear Transformation (DLT) algorithm.

2. The image processing apparatus of claim 1, wherein the first selection unit selects the first pixel group including the at least one pixel by applying a corner detection algorithm to the input color image.

3. The image processing apparatus of claim 2, wherein the corner detection algorithm uses a Harris operator.

4. The image processing apparatus of claim 1, wherein the second selection unit selects at least one pixel of the input depth image by applying a corner detection algorithm to the input depth image, matches each of the at least one pixel of the input depth image with each of the at least one pixel included in the first pixel group, and selects the second pixel group including the at least one pixel of the matched input depth image.

5. The image processing apparatus of claim 1, wherein, when a deviation of Z-coordinate value of each of the at least one pixel included in the second pixel group is less than a predetermined value, the calculation unit calculates the transformation function excluding information about the Z-coordinate value of each of the at least one pixel included in the second pixel group.

6. The image processing apparatus of claim 1, wherein the image matching unit matches each pixel of the input color image with each pixel of the input depth image by applying the transformation function to each of the pixels of the input depth image.

7. The image processing apparatus of claim 1, wherein the image matching unit applies an interpolation to each pixel of the input depth image, when a resolution of the input color image is not identical to that of the input depth image, so that each of the pixels of the input depth image are matched with each pixel of the input color image.

8. An image processing apparatus, comprising:
a computer comprising:
a first selection unit to select a first pixel group including at least one pixel from an input color image;
a second selection unit to select a second pixel group including at least one pixel, corresponding to each of the at least one pixel included in the first pixel group, from an intensity image matched with an input depth image, the input depth image comprising geometry information;
a calculation unit to calculate a transformation function of the first pixel group and second pixel group based on a coordinate value of each of the at least one pixel included in the first pixel group and a coordinate value of each of the at least one pixel included in the second pixel group; and
an image matching unit to match each pixel of the input color image with each pixel of the input depth image based on the transformation function,
wherein the transformation function is a transformation matrix obtained by using a Direct Linear Transformation (DLT) algorithm.

9. The image processing apparatus of claim 8, wherein the second selection unit selects at least one pixel of the intensity image by applying a corner detection algorithm to the intensity image matched with the input depth image, matches each of the at least one pixel of the intensity image with each of the at least one pixel included in the first pixel group, and selects the second pixel group including the at least one pixel of the matched input depth image.

10. The image processing apparatus of claim 8, wherein, when a deviation of Z-coordinate value of each of the at least one pixel included in the second pixel group is less than a predetermined value, the calculation unit calculates the transformation function excluding information about the Z-coordinate value of each of the at least one pixel included in the second pixel group.

11. An image processing apparatus, comprising:
a computer comprising:
a first selection unit to select a first pixel group including at least one pixel from an input color image;
a second selection unit to receive information about a second pixel group including at least one pixel, corresponding to each of the at least one pixel included in the first pixel group, from an intensity image matched with an input depth image, the input depth image comprising geometry information;
a calculation unit to calculate a transformation function of the first pixel group and second pixel group based on a coordinate value of each of the at least one pixel included in the first pixel group and a coordinate value of each of the at least one pixel included in the second pixel group; and
an image matching unit to match each pixel of the input color image with each pixel of the input depth image based on the transformation function,
wherein the transformation function is a transformation matrix obtained by using a Direct Linear Transformation (DLT) algorithm.

12. The image processing apparatus of claim 11, wherein the first selection unit selects the first pixel group including the at least one pixel by applying a corner detection algorithm to the input color image.

13. The image processing apparatus of claim 11, wherein the calculation unit calculates the transformation function excluding information about a Z-coordinate value of each of the at least one pixel included in the second pixel group.

14. The image processing apparatus of claim 11, wherein the of claim 13, wherein the image matching unit applies an interpolation to each pixel of the input depth image, when a resolution of the input color image is not identical to that of the input depth image, each of the pixels of the input depth image being matched with each pixel of the input color image.

15. An image processing method, comprising:
selecting a first pixel group including at least one pixel from an input color image;
selecting a second pixel group including at least one pixel, corresponding to each of the at least one pixel included in the first pixel group, from an input depth image, the input depth image comprising geometry information;
calculating, by a computer, a transformation function of the first pixel group and second pixel group based on a coordinate value of each of the at least one pixel included in the first pixel group and a coordinate value of each of the at least one pixel included in the second pixel group; and
matching each pixel of the input color image with each pixel of the input depth image based on the transformation function,
wherein the transformation function is a transformation matrix obtained by using a Direct Linear Transformation (DLT) algorithm.

16. The image processing method of claim 15, wherein the selecting of the second pixel group comprises:
selecting at least one pixel of the input depth image by applying a corner detection algorithm to the input depth image;
matching each of the at least one pixel of the input depth image with each of the at least one pixel included in the first pixel group; and
selecting the second pixel group including the at least one pixel of the matched input depth image.

17. A non-transitory computer-readable recording medium having stored thereon instructions for implementing an image processing method, the instructions comprising:
an instruction set of selecting a first pixel group including at least one pixel from an input color image;
an instruction set of selecting a second pixel group including at least one pixel, corresponding to each of the at least one pixel included in the first pixel group, from an input depth image, the input depth image comprising geometry information;
an instruction set of calculating a transformation function of the first pixel group and second pixel group based on a coordinate value of each of the at least one pixel included in the first pixel group and a coordinate value of each of the at least one pixel included in the second pixel group; and
an instruction set of matching each pixel of the input color image with each pixel of the input depth image based on the transformation function,
wherein the transformation function is a transformation matrix obtained by using a Direct Linear Transformation (DLT) algorithm.

* * * * *